Patented Aug. 15, 1950

2,519,189

UNITED STATES PATENT OFFICE 2,519,189

PROTECTION OF VINYLIDENE CHLORIDE POLYMERS FROM THE EFFECTS OF LIGHT

Thomas Houtman, Jr., Midland, Mich., assignor to The Dow Chemical Company, Midland, Mich., a corporation of Delaware No Drawing. Application October 30, 1946, Serial No. 706,797

5 Claims. (Cl. 260—45.95)

This invention relates to compositions comprising polymeric vinylidene chloride or polymeric vinyl chloride products, and certain light stabilizers therefor.

It has become well recognized that polymers obtained by the polymerization of vinylidene chloride alone or with other polymerizable materials, including those in which the vinylidene chloride is a significant though minor constituent, are industrially valuable materials, but that such polymeric products, whether molded, extruded, or deposited from solution, are subject to darkening and decomposition when exposed for prolonged periods to the effects of light. This latter defect is particularly noticeable in articles of thin cross-section, and especially when the polymeric product is subjected to the effects of ultra-violet radiations. Various materials have been suggested for use as light stabilizers of polymers comprising significant amounts (10 per cent or more) of vinylidene chloride. Of these, the 2,2'-dihydroxybenzophenone disclosed by Boyer et al. in U. S. Patent No. 2,264,291 is among the most satisfactory, purely on the basis of protection afforded per unit weight of stabilizer, but this compound has the particular disadvantage of contributing a distinct yellow color to its compositions. This is objectionable in many fields of use of the polymers concerned. A similar problem exists with respect to vinyl chloride polymers.

It is accordingly among the objects of the invention to provide a composition comprising a polymer containing at least 10 per cent either of vinylidene chloride or vinyl chloride, stabilized against the darkening effects of exposure to light. A related object is to provide a composition comprising such a vinylidene chloride-containing polymer and certain new light stabilizers therefor.

It has now been found that the foregoing and related objects may be attained through the incorporation in a polymeric vinylidene chloride or vinyl chloride product (containing at least about 10 per cent of vinylidene chloride or of vinyl chloride) of certain substituted 2-hydroxy acylophenones having the general formula

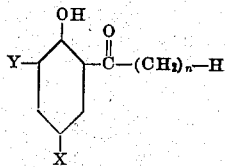

wherein $n$ is an integer from 1 to 17, inclusive, X is a substituent selected from the group consisting of chlorine and lower alkyl radicals containing from 1 to 4 carbon atoms, and Y is hydrogen when X is alkyl, and is a member of the group consisting of hydrogen and chlorine when X is chlorine.

These stabilizers may be incorporated with advantage in the polymer in amounts from about 0.5 to as much as 10 per cent of the weight of polymer. They have no tendency to discolor the polymer products and serve to protect them from the darkening effects of light. The present compounds may be added to the polymer in any of several ways, so long as reasonably uniform distribution of the stabilizer through the polymer is thereby obtained.

To illustrate the advantageous effects of the herein concerned stabilizers, it may be pointed out that an untreated film or filament of a polymer comprising significant amounts of vinylidene or vinyl chloride may assume a dark brown or black coloration on exposure to sunlight, and that similar films or filaments of the treated composition resist discoloration under the same conditions of exposure for long periods of time.

The following example illustrates the practice of the present invention:

A powdered copolymer of about 85 per cent vinylidene chloride and 15 per cent vinyl chloride, plasticized with 7 per cent of its weight of di-(alpha-phenylethyl) ether, was thoroughly mixed with 5 per cent of its weight of the indicated stabilizer, which had been dissolved in acetone. After mixing, the mass was dried and the resulting powder was molded to form discs 0.004 inch thick. These samples were exposed to Florida sunlight in an outdoor exposure test. The extent of darkening was determined by measuring the ability of each sample to transmit visible light before and after the outdoor exposure. A similar measurement was made on identical discs stored indoors in normal diffused light for 2 months. Other portions of the modified compositions were extruded as filaments of 0.020 inch diameter. These were wound on sample cards and exposed to Florida sunlight and to the radiations in a standard fadeometer. These samples were rated on an arbitrary numerical basis, as follows:

| Rating | Description | Comment |
|---|---|---|
| 1 | Unchanged—very good | Acceptable. |
| 2 | Very slightly changed—good | Do. |
| 3 | Brownish tinge—fair | Usually acceptable. |
| 4 | Dark brown—bad | Unacceptable. |
| 5 | Black—very bad | Do. |

The results of such tests with various of the herein concerned stabilizers are given in the following tables. Table 1 shows the results of tests on molded discs and Table 2 shows the results of tests on extruded monofilaments.

2-hydroxy 3,5-dichloro dodecanophenone
2-hydroxy 5-chloro tetradecanophenone
2-hydroxy 3,5-dichloro tetradecanophenone

Table 1

| Stabilizer | Amount, Per Cent | Per Cent of Visible Light Transmitted | | | |
|---|---|---|---|---|---|
| | | Before | After 2 Months Diffused Light | After 1 Month Florida Sunlight | Loss |
| None | 0 | 81 | 70 | | 11 |
| None | 0 | 81 | | 30 | 51 |
| (1) 2-Hydroxy 5-methyl acetophenone | 5 | 80.3 | 79 | | 1.3 |
| Do | 5 | 80.0 | | 69.1 | 10.9 |
| Do | 6 | 80.8 | 79.9 | | 0.9 |
| Do | 6 | 80.1 | | 69.3 | 10.8 |
| (2) 2-Hydroxy 3,5-dichloro acetophenone | 2 | 82.8 | 81.5 | | 1.3 |
| Do | 2 | 81.4 | | 69.9 | 11.5 |
| Do | 4 | 81.9 | | 72.2 | 9.7 |
| Do | 6 | 80.5 | | 74.5 | 6.0 |
| (3) 2-Hydroxy 5-chloro propiophenone | 4 | 80.7 | 79.8 | | 0.9 |
| Do | 4 | 79.0 | | 71.1 | 7.9 |
| Do | 6 | 80.0 | | 73.3 | 6.7 |
| (4) 2-Hydroxy 3,5-dichloro propiophenone | 1 | 81.4 | 80.0 | | 1.4 |
| Do | 6 | 79.8 | | 69.6 | 10.2 |
| (5) 2-Hydroxy 5-methyl octanophenone | 4 | 80.6 | 81.1 | | |
| Do | 4 | 81.1 | | 71.0 | 10.1 |
| (6) 2-Hydroxy 5-chloro stearophenone | 3 | ¹56.9 | | 52.8 | 4.1 |
| Do | 4 | ¹58.9 | | 55.2 | 3.7 |
| (7) 2-Hydroxy 3,5-dichloro stearophenone | 6 | ¹60.8 | | 51.3 | 9.5 |
| (8) 2-Hydroxy 5-chloro acetophenone | 1 | 82.5 | 81.5 | | 1.0 |
| Do | 5 | 81.7 | | 71.4 | 11.3 |
| (9) 2-Hydroxy 5-methyl propiophenone | 1 | 80.7 | 80.6 | | 0.1 |
| Do | 6 | 80.3 | | 70.5 | 9.8 |
| (10) 2-Hydroxy 5-chloro butyrophenone | 5 | 79.4 | 78.0 | | 1.4 |
| Do | 5 | 78.7 | | 69.1 | 9.6 |
| (11) 2-Hydroxy 5-methyl stearophenone | 3 | ¹66.2 | 79.6 | | |
| Do | 3 | ¹61.7 | | 55.7 | 6.0 |
| (12) 2-Hydroxy 3,5-dichloro butyrophenone | 3 | 82.5 | 81.9 | | 0.6 |
| Do | 3 | 81.0 | | 71.8 | 9.2 |
| (13) 2-Hydroxy 5-methyl butyrophenone | 5 | 77.8 | 77.8 | | |
| Do | 5 | 77.6 | | 69.3 | 8.3 |
| (14) 2-Hydroxy 5-chloro octanophenone | 4 | 80.7 | | 71.1 | 9.6 |
| Do | 5 | 79.6 | | 72.1 | 7.5 |
| Do | 6 | 76.7 | | 74.2 | 2.5 |
| (15) 2-Hydroxy 3,5-dichloro octanophenone | 1 | 80.0 | 80.3 | | |
| Do | 3 | 80.4 | | 72.0 | 8.4 |
| Do | 4 | 80.5 | | 74.8 | 5.7 |

¹ Blushed.

Table 2

| Stabilizer (number from Table 1) | Amount, Per Cent | Rating After Exposure | | | | | |
|---|---|---|---|---|---|---|---|
| | | Fadeometer | | | Florida Sunshine | | |
| | | 50 Hours | 100 Hours | 200 Hours | 1 Month | 3 Months | 6 Months |
| None | 0 | 5+ | | | 5+ | | |
| 1 | 4 | 3 | | | 3 | | |
| 1 | 6 | 3 | 3 | | 3 | | 3 |
| 2 | 4 | 2 | 2 | 3 | 2 | 3 | 2 |
| 2 | 5 | 1 | 2 | 3 | 1 | 2 | 2 |
| 2 | 6 | 1 | 2 | 2 | 1 | 1 | 1 |
| 3 | 3 | 2 | 4 | | 3 | | 3 |
| 3 | 5 | 2 | 3 | 4 | 2 | 3 | 3 |
| 3 | 6 | 2 | 3 | 4 | 2 | 3 | 2 |
| 4 | 6 | 3 | 3 | 4 | 2 | 4 | 4 |
| 5 | 4 | 2 | 3 | 4 | 2 | 3 | 4 |
| 5 | 6 | 2 | 3 | 4 | 2 | 3 | 4 |
| 6 | 5 | 3 | | | 3 | | |
| 7 | 6 | 3 | | | 3 | | |
| 8 | 4 | 2 | 3 | 4 | 3 | | 3 |
| 8 | 6 | 2 | 3 | 4 | 2 | 2 | 3 |
| 9 | 4 | 2 | 3 | 4 | 3 | | 3 |
| 9 | 6 | 2 | 3 | 4 | 3 | | 3 |
| 10 | 3 | 2 | 3 | 4 | 2 | | 2 |
| 10 | 5 | 2 | 3 | 4 | | | |
| 11 | 6 | 3 | | | 3 | 4 | |
| 12 | 3 | 3 | 3 | 4 | 2 | | 2 |
| 12 | 4 | 2 | 3 | 3 | 2 | | 2 |
| 12 | 5 | 2 | 3 | 3 | 1 | 2 | 2 |
| 13 | 5 | 2 | 3 | 4 | 2 | | 3 |
| 14 | 3 | 2 | 3 | 4 | 2 | 3 | 3 |
| 14 | 6 | 2 | 3 | 4 | 1 | | 2 |
| 15 | 4 | 2 | 3 | 4 | 1 | | 2 |

Other compounds of the same class which give similar results include 2-hydroxy 5-chloro hexanophenone
2-hydroxy 3,5-dichloro hexanophenone
2-hydroxy 5-chloro dodecanophenone Compounds may also be used in which the various methyl, ethyl, propyl and butyl radicals replace the chlorine in the 5-position in any of the compounds named.

The data in the tables indicate that compositions containing one per cent or more of the new stabilizers show improvement over the untreated compositions, and that the presence of 3 per cent or more of these stabilizers gives compositions of surprisingly high color stability when exposed under the severe conditions of the tests. All of the new stabilizers are effective in the shorter tests, indicating general utility in compositions for normal exposure to light, and most of them give adequate protection in the extended tests to indicate utility in compositions which may be given outdoor exposure to direct sunlight. No advantage is found in using over about 6 per cent of the stabilizers for their light protective effect, but, since they have plasticizing action as well, larger amounts may be used if desired.

The invention has been illustrated with respect to the copolymer of vinylidene chloride and vinyl chloride. It is equally applicable to each of the polymers containing significant amounts, usually 10 per cent or more, of vinylidene chloride or of vinyl chloride, whether the other copolymerized ingredient is vinyl acetate, vinyl butyrate, styrene, acrylonitrile, ethyl acrylate or methyl methacrylate, or the like. The invention may be employed with molded and extruded forms of these polymers and to protect solutions of the polymers and films deposited from such solutions.

I claim:

1. A composition of matter comprising a binary copolymer of vinylidene chloride and vinyl chloride which tends to darken on exposure to light, and, to protect the copolymer against the injurious effects of light, from 0.5 to 10 per cent of a 2-hydroxy 3,5-dichloro acylophenone in which the acyl radical has from 2 to 18 carbon atoms, inclusive.

2. A composition of matter comprising a copolymer of about 85 per cent vinylidene chloride, balance vinyl chloride, and, to protect the copolymer against the injurious effects of light, from 0.5 to 10 per cent of a 2-hydroxy 3,5-dichloro acylophenone in which the acyl radical has from 2 to 18 carbon atoms, inclusive.

3. A composition of matter comprising a copolymer of about 85 per cent vinylidene chloride, balance vinyl chloride, and, to protect the copolymer against the injurious effects of light, from 0.5 to 10 per cent of 2-hydroxy 3,5-dichloro acetophenone.

4. A composition of matter comprising a copolymer of about 85 per cent vinylidene chloride, balance vinyl chloride, and, to protect the copolymer against the injurious effects of light, from 0.5 to 10 per cent of 2-hydroxy 3,5-dichloro butyrophenone.

5. A composition of matter comprising a copolymer of about 85 per cent vinylidene chloride, balance vinyl chloride, and, to protect the copolymer against the injurious effects of light, from 0.5 to 10 per cent of 2-hydroxy 3,5-dichloro octanophenone.

THOMAS HOUTMAN, Jr.

REFERENCES CITED

The following references are of record in the file of this patent:

UNITED STATES PATENTS

| Number | Name | Date |
|---|---|---|
| 2,136,333 | Coleman | Nov. 8, 1938 |
| 2,362,376 | Heymann | Nov. 7, 1944 |
| 2,364,027 | Marshall | Nov. 28, 1944 |